(12) United States Patent
Immonen

(10) Patent No.: US 11,194,695 B2
(45) Date of Patent: Dec. 7, 2021

(54) METHOD FOR BLOCKING EXTERNAL DEBUGGER APPLICATION FROM ANALYSING CODE OF SOFTWARE PROGRAM

(71) Applicant: Supercell Oy, Helsinki (FI)

(72) Inventor: Aki Immonen, Espoo (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 16/736,242

(22) Filed: Jan. 7, 2020

(65) Prior Publication Data
US 2021/0208997 A1 Jul. 8, 2021

(51) Int. Cl.
*G06F 11/36* (2006.01)
*G06F 21/71* (2013.01)

(52) U.S. Cl.
CPC ...... *G06F 11/3612* (2013.01); *G06F 11/3624* (2013.01); *G06F 11/3656* (2013.01); *G06F 21/71* (2013.01)

(58) Field of Classification Search
CPC ............. G06F 11/3612; G06F 11/3624; G06F 11/3656; G06F 21/71
USPC .................................................. 717/124–135
See application file for complete search history.

(56) References Cited

U.S. PATENT DOCUMENTS

| 6,567,933 | B1 * | 5/2003 | Swoboda ............ G06F 11/3656 710/59 |
| 7,054,443 | B1 * | 5/2006 | Jakubowski ...... G11B 20/00086 380/201 |
| 2001/0052053 | A1 * | 12/2001 | Nemirovsky ........... H04L 49/90 711/138 |
| 2006/0137016 | A1 * | 6/2006 | Margalit ................. G06F 21/14 726/26 |

(Continued)

OTHER PUBLICATIONS

Schrittwieser, Sebastian, et al. "Protecting software through obfuscation: Can it keep pace with progress in code analysis?." ACM Computing Surveys (CSUR) 49.1 (2016): pp. 1-37. (Year: 2016).*

(Continued)

*Primary Examiner* — Satish Rampuria
(74) *Attorney, Agent, or Firm* — Ziegler IP Law Group, LLC

(57) ABSTRACT

A method for blocking external debugger application from analysing code of software program installed on computing device. The method including initializing software program including an application program and an internal debugger application. The software program, upon initialization thereof, instructs internal debugger application to load application program in internal debugger application. The internal debugger application is configured to utilize kernel resources of an operating system of the computing device. The method includes executing internal debugger application to set one or more break-points in code of application program to define execution path for code of application program, executing application program as per defined (Continued)

execution path for code thereof, stopping execution of code of application program upon reaching any of one or more break-points therein, and handing control to internal debugger application to provide an address for next instruction to be executed in defined execution path for code of application program.

28 Claims, 3 Drawing Sheets

(56) References Cited

U.S. PATENT DOCUMENTS

2009/0282474 A1* 11/2009 Chen ............... G06F 21/51
726/21

OTHER PUBLICATIONS

Patil, Harish, et al. "Pinplay: a framework for deterministic replay and reproducible analysis of parallel programs." Proceedings of the 8th annual IEEE/ACM international symposium on Code generation and optimization. 2010.pp. 2-11 (Year: 2010).*

Linstead, Erik, Cristina Lopes, and Pierre Baldi. "An application of latent Dirichlet allocation to analyzing software evolution." 2008 Seventh International Conference on Machine Learning and Applications. IEEE, 2008.pp. 813-818 (Year: 2008).*

Gagnon, Michael N., Stephen Taylor, and Anup K. Ghosh. "Software protection through anti-debugging." IEEE Security & Privacy 5.3 (2007): pp. 82-84. (Year: 2007).*

Williams, Michael. "ARMV8 debug and trace architectures." Proceedings of the 2012 System, Software, SoC and Silicon Debug Conference. IEEE, 2012.pp. 1-6 (Year: 2012).*

Gaisler, Jiri, and Andre-Louis Pouponnot. "Hardware debug support in the LEON processor." Data Systems in Aerospace. vol. 509. 2002.pp. 1-7 (Year: 2002).*

Peterson, Kevin, and Yvon Savaria. "Assertion-based on-line verification and debug environment for complex hardware systems." 2004 IEEE International Symposium on Circuits and Systems (IEEE Cat. No. 04CH37512). vol. 2. IEEE, 2004.pp. 685-688 (Year: 2004).*

* cited by examiner

METHOD FOR BLOCKING EXTERNAL DEBUGGER APPLICATION FROM ANALYSING CODE OF SOFTWARE PROGRAM

TECHNICAL FIELD

The present disclosure relates generally to systems and methods to prevent software piracy; and more specifically, to methods, systems and computing devices for blocking an external debugger application from analysing a code of a software program.

BACKGROUND

Software piracy and unauthorized access, modification, and exploitation of software applications, such as computer games, console-game applications, simulation applications, coding and testing console-based applications and the like has become a growing and serious problem. Software piracy may lead to loss of revenue due to unauthorized distribution of pirated copies of software program. Furthermore, in addition to loss of revenue due distribution of pirated copies, software piracy also imposes a threat to expose valuable trade secrets that may be embodied in a particular software program. In addition, software piracy also imposes a threat to intellectual property rights that an individual and/or a company may have sought protection for. In particular, a software program company may achieve a significant competitive advantage by having unauthorized access to a competitor's software program.

Typically, software programs consist of electronic files or a piece of code that are arranged in a specific manner in order to be compatible with known microprocessors and operating systems, thereby making the software programs vulnerable to modification by hackers or crackers. Conventionally, there are many software security mechanisms available that may be used to limit unauthorized access to software programs. Most software security mechanisms are simplistic in nature, such as introducing genuity licenses, encrypted passwords or keys to block malicious users. However, such security checks can be easily by-passed by skilled hackers using widely available tools such as "ProcDump", which is memory lifting tool, in conjunction with powerful debugging tools. Such tools are able to capture any data content from any memory location, regardless of how protected the memory was thought to be, or monitor file system and transcribe files to access data, or duplicate an entire OS, for example by using an in-circuit emulator. Such tools are typically utilized by hackers to analyse the software code step-by-step that helps the hacker to reverse engineer, modify or duplicate content of the software programs. Furthermore, to overcome this, many software programs employ software security mechanisms, such as encrypting a portion to hinder the ability of hackers or crackers to overcome a software's license restrictions, or prevent a hacker from understanding a piece of code of the software program. However, such security mechanisms are also often easily breached by skilled hackers or crackers.

Therefore, in light of the foregoing discussion, there exists a need to overcome the aforementioned drawbacks with software security mechanisms to protect a software program from unauthorized modification or exploitation by preventing analysis of code of the software program.

SUMMARY

The present disclosure seeks to provide a method for blocking an external debugger application from analysing a code of a software program installed on a computing device. The present disclosure also seeks to provide a computer program product installed on a computing device, that when accessed by a processing device associated with the computing device, blocks an external debugger application from analysing a code of a software program installed on a computing device. The present disclosure also seeks to provide a computer program product comprising an application program and an internal debugger application, that when executed blocks an external debugger application from analysing a code of a software program installed on a computing device. The present disclosure also seeks to provide a computing device for blocking an external debugger application from analysing a code of a software program installed on a computing device. The present disclosure also seeks to provide a system for system for blocking an external debugger application from analysing a code of an application program installed on a computing device.

The present disclosure seeks to provide a solution to the existing problem of software piracy and unauthorized access, modification or exploitation of a software program. An aim of the present disclosure is to provide a solution that overcomes at least partially the problems encountered in prior art, and provides a reliable and efficient method for blocking an external debugger application from analysing a code of a software program installed on a computing device.

In a first aspect, an embodiment of the present disclosure provides a method for blocking an external debugger application from analysing a code of a software program installed on a computing device, the method comprising:
- initializing the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;
- executing the internal debugger application to set one or more break-points in the code of the application program to define an execution path for the code of the application program;
- executing the application program as per the defined execution path for the code thereof
- stopping execution of the code of the application program upon reaching any of the one or more break-points therein; and
- handing control to the internal debugger application to provide an address for next instruction to be executed in the defined execution path for the code of the application program.

In a second aspect, an embodiment of the present disclosure provides a computer program product comprising computer-readable code means which, when run in a processing device will cause the processing device to perform the method according to any embodiment of the description. In particular, a computer program product is provided which is installed on a computing device, the computer program product comprising a non-transitory machine-readable data storage medium having stored thereon program instructions of a software program that, when accessed by a processing device associated with the computing device, will cause the processing device to:
- initialize the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;

execute the internal debugger application to set one or more break-points in the code of the application program to define an execution path for the code of the application program;

execute the application program as per the defined execution path for the code thereof stop execution of the code of the application program upon reaching any of the one or more break-points therein; and handover control to the internal debugger application to provide an address for next instruction to be executed in the defined execution path for the code of the application program.

In a third aspect, an embodiment of the present disclosure provides a computer program product embodied as a non-transitory machine-readable data storage medium for a computing device, the computer program product comprising a software program, wherein the software program comprises:

an application program; and an internal debugger application configured to utilize kernel resources of an operating system of the computing device to block an external debugger application from analysing a code of the software program, the internal debugger application, when executed, causes the computing device to:

load the application program in the internal debugger application;

set one or more break-points in the code of the application program to define an execution path for the code of the application program;

execute the application program as per the defined execution path for the code thereof;

stop execution of the code of the application program upon reaching any of the one or more break-points therein; and handover control to the internal debugger application to provide an address for next instruction to be executed in the defined execution path for the code of the application program.

The computer program products according to the invention may be stored and executed in a computer device or a system as outlined below for blocking an external debugger application from analysing a code of a software program.

In a fourth aspect, an embodiment of the present disclosure provides a computing device for blocking an external debugger application from analysing a code of a software program installed on the computing device, the computing device configured to:

initialize the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;

execute the internal debugger application to set one or more break-points in the code of the application program to define an execution path for the code of the application program;

execute the application program as per the defined execution path for the code thereof stop execution of the code of the application program upon reaching any of the one or more break-points therein; and handover control to the internal debugger application to provide an address for next instruction to be executed in the defined execution path for the code of the application program.

In a fifth aspect, an embodiment of the present disclosure provides a system for blocking an external debugger application from analysing a code of an application program installed on a computing device, the system comprising:

a debugging server communicatively coupled to the computing device, the debugging server configured to attach an internal debugger application to the application program, wherein the internal debugger application is configured to utilize kernel resources of an operating system of the computing device, the internal debugger application when executed, causes the computing device to:

load the application program in the internal debugger application;

set one or more break-points in the code of the application program to define an execution path for the code of the application program;

execute the application program as per the defined execution path for the code thereof;

stop execution of the code of the application program upon reaching any of the one or more break-points therein; and handover control to the internal debugger application to provide an address for next instruction to be executed in the defined execution path for the code of the application program.

Embodiments of the present disclosure substantially eliminate or at least partially address the aforementioned problems in the prior art, and provides a reliable and efficient method for preventing analysis of code of an application program Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
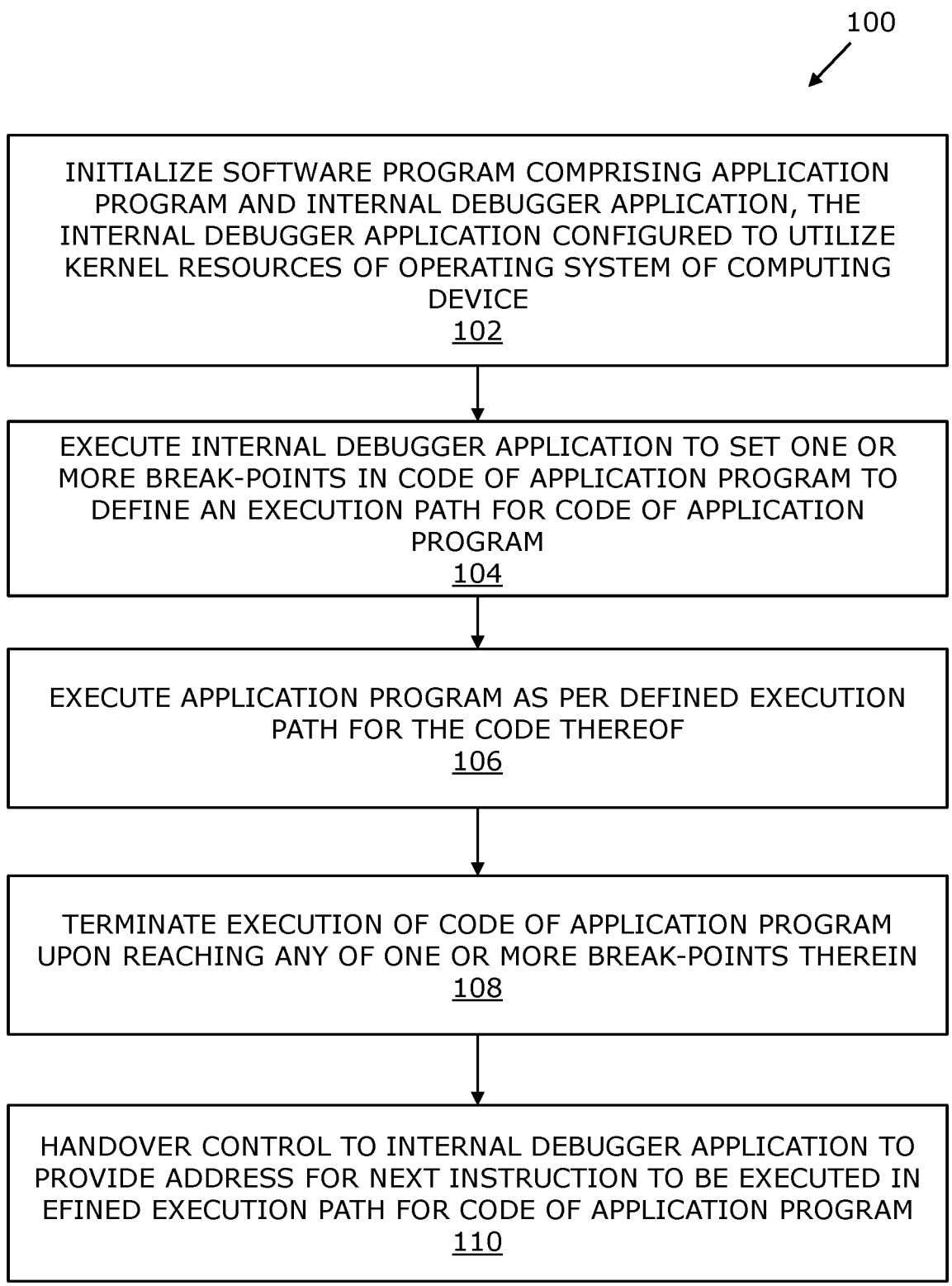
FIG. 1 is a flowchart depicting steps of a method for blocking an external debugger application from analysing a code of a software program installed on a computing device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a method for blocking an external debugger application from analysing a code of a software program installed on a computing device, the method comprising:

initializing the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;

executing the internal debugger application to set one or more break-points in the code of the application program to define an execution path for the code of the application program;

executing the application program as per the defined execution path for the code thereof stopping execution of the code of the application program upon reaching any of the one or more break-points therein; and handing control to the internal debugger application to provide an address for next instruction to be executed in the defined execution path for the code of the application program.

In a second aspect, an embodiment of the present disclosure provides a computer program product installed on a computing device, the computer program product comprising a non-transitory machine-readable data storage medium having stored thereon program instructions of a software program that, when accessed by a processing device associated with the computing device, will cause the processing device to:

initialize the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;

execute the internal debugger application to set one or more break-points in the code of the application program to define an execution path for the code of the application program;

execute the application program as per the defined execution path for the code thereof stop execution of the code of the application program upon reaching any of the one or more break-points therein; and handover control to the internal debugger application to provide an address for next instruction to be executed in the defined execution path for the code of the application program.

In a third aspect, an embodiment of the present disclosure provides a computer program product embodied as a non-transitory machine-readable data storage medium for a computing device, the computer program product comprising a software program, wherein the software program comprises:

an application program; and an internal debugger application configured to utilize kernel resources of an operating system of the computing device to block an external debugger application from analysing a code of the software program, the internal debugger application, when executed, causes the computing device to:

load the application program in the internal debugger application;

set one or more break-points in the code of the application program to define an execution path for the code of the application program;

execute the application program as per the defined execution path for the code thereof;

stop execution of the code of the application program upon reaching any of the one or more break-points therein; and handover control to the internal debugger application to provide an address for next instruction to be executed in the defined execution path for the code of the application program.

In a fourth aspect, an embodiment of the present disclosure provides a computing device for blocking an external debugger application from analysing a code of a software program installed on a computing device, the computing device configured to:

initialize the software program comprising an application program and an internal debugger application, wherein the software program, upon initialization thereof, instructs the internal debugger application to load the application program in the internal debugger application, and wherein the internal debugger application is configured to utilize kernel resources of an operating system of the computing device;

execute the internal debugger application to set one or more break-points in the code of the application program to define an execution path for the code of the application program;

execute the application program as per the defined execution path for the code thereof stop execution of the code of the application program upon reaching any of the one or more break-points therein; and handover control to the internal debugger application to provide an address for next instruction to be executed in the defined execution path for the code of the application program In a fifth aspect, an embodiment of the present disclosure provides a system for blocking an external debugger application from analysing a code of an application program installed on a computing device, the system comprising:

a debugging server communicatively coupled to the computing device, the debugging server configured to attach an internal debugger application to the application program, wherein the internal debugger application is configured to utilize kernel resources of an operating system of the computing device, the internal debugger application when executed, causes the computing device to:

load the application program in the internal debugger application;

set one or more break-points in the code of the application program to define an execution path for the code of the application program;

execute the application program as per the defined execution path for the code thereof;

stop execution of the code of the application program upon reaching any of the one or more break-points therein; and handover control to the internal debugger application to provide an address for next instruction to be executed in the defined execution path for the code of the application program.

The present disclosure provides a method for blocking an external debugger application from analysing a code of a software program installed on a computing device by implementing an internal debugger application in conjunction with an application program during run time. The present disclosure provides methods and systems that allow for execution of software programs in a manner that prevents analysis of a code of the application program, thereby preventing unauthorized access and modification of code of the application program. The present disclosure provides methods and systems to block external debugger application by integrating a code of the application program with a code of the internal debugger application. Beneficially, such a method prevents piracy of software programs in an inexpensive, less time-consuming and highly efficient manner. The present disclosure provides a method for attaching an internal debugger application integrated with the application program that prevents users from attaching an external debugger application with the software program, thereby restricting unauthorized users to analyse a code of the software program.

Throughout the present disclosure, the term "software program" refers to refers to a collection or set of instructions, also referred to as a code, installed on a computing device. The collection or set of instructions executable by the computing device or other digital system so as to configure the computer or the digital system to perform a task that is the intent of the software program. Herein, the term "software program" encompasses code of the application program embedded with code of the internal debugger application, such that initializing of the software program loads the internal debugger application followed by the loading of the application program in the internal debugger application. It will be appreciated that the term "software program" as used herein is used to refer a complete software package comprising the application program and the internal debugger application, that when executed in the computing device blocks an external debugger application from attaching to the software program, and thereby preventing analysis of code of the software program.

In one or more embodiments, the term "software program" is intended to encompass such instructions stored in storage medium such as RAM, a hard disk, optical disk, or so forth, and is also intended to encompass so-called "firmware" that is software program stored on a ROM or so forth. Optionally, the software program refers to a software application. Such software program is organized in various ways, for example the software program includes software components organized as libraries, Internet-based programs stored on a remote server or so forth, source code, interpretive code, object code, directly executable code, and so forth. It may be appreciated that the software program may invoke system-level code or calls to other software residing on a server or other location to perform certain functions. Furthermore, the software program may be pre-configured and pre-integrated with an operating system, building a software appliance.

Throughout the present disclosure, the term "application program" as used herein refers to a collection or set of instructions, also referred to as a code, installed on a computing device. The term "application program" is used broadly herein, to include applications, kernels, drivers, interrupt handlers, libraries, written by programmers (who are also referred to as developers). In other words, the term "application program" encompasses complete, self-contained computer programs designed to perform specific functions, tasks, or activities, when the application program is executed in the computing device. Optionally, the application program is a gaming application program. For example, the gaming application program may include a number of gaming applications of various genres, such as racing games, adventure games, puzzle games, action games, role-playing games (RPG), strategy games, shooting games, simulation games and so forth.

Additionally, the application program may be stored in a storage medium such as RAM, a hard disk, optical disk, or so forth, and is also intended to encompass so-called "firmware" that is software stored on a ROM or so forth. Such application programs are organized in various ways, for example the application program includes components organized as libraries, Internet-based programs stored on a remote server or so forth, source code, interpretive code, object code, directly executable code, and so forth. It may be appreciated that the application program may invoke system-level code or calls to other software residing on a server or other location to perform certain functions.

Further, the term "code" as used herein refers to processor instructions, data (which includes constants, variables, and data structures), or both instructions and data. It will be appreciated that the code is prevented for analysis by unauthorized users by implementing the present method. Similarly, such terms may include or comprise a manner designed to implement subroutine, a function, a procedure, an object method, the software program executing on a computing device, interfaces, or objects, executable application, an applet, a servlet, source code, object code, or intermediate code, a shared library and/or dynamic loading/link library and/or other sequence of instructions or groups of instructions number.

Optionally, the code of the application program includes multiple code blocks. The term "code block" as used herein refers to a module of the executable code that is configured to perform a specific task of one or more intended tasks of the application program. Generally, the code block is configured to receive an input, process the input and return a result as an output based on the processing of the input. Each of the one or more code blocks is associated with a memory in the computing device.

Optionally, the application programs are developed in suitable operating environments that include, but are not limited to Java® environments and some include environments which utilize languages such as C, C++, C#, Python, R-programming language, Oracle. It will be appreciated that a person skilled in the art would understand that the disclosed methods and systems are applicable with a wide variety of programming languages, programming models, and programs, as well as with technical endeavours outside the field of software development, and is not limited to only gaming application programs.

As aforementioned, the application program is installed on the computing device. Throughout the present disclosure, the term "computing device" as used herein generally relates to an electronic device associated with (or used by) a user that is capable of enabling the user to perform specific tasks associated with the application program. Furthermore, the computing device is intended to be broadly interpreted to include any electronic device that may be used for voice and/or data communication over a wireless communication network. The computing device can include and is not limited to a, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), Handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs), a video slot machine, a video poker machine, a kiosk, a casino personal device, and typically includes many or all of the elements described above relative to the gaming apparatus.

Notably, the term "computing device" is used herein to refer to an electronic device such as general-purpose computers on which the software program is installed, as a package comprising the application program and the internal debugger application. Further, the term "computing device" is also used to encompass game consoles such as Microsoft Xbox™, the Nintendo Wii™, Sony PlayStation™ and the like.

Furthermore, the computing device include a processing device and a memory. The processing device may be one or more known processors, such as microprocessors manufactured by Intel™ or AMD™ or licensed by ARM. Processing device may constitute a single core or multiple core processors that executes parallel processes simultaneously. For example, processor may be a single core processor configured with virtual processing technologies. In certain embodiments, the processing device may use logical processors to simultaneously execute and control multiple processes. Processing device may implement virtual machine technologies, or other known technologies to provide the ability to execute, control, run, manipulate, and store multiple software processes, applications, programs, etc. In another embodiment, the processing device may include a multi-core processor arrangement (e.g., dual, quad core, etc.) configured to provide parallel processing functionalities to allow the computing device to execute multiple processes simultaneously. One of ordinary skill in the art would understand that other types of processing device arrangements could be implemented that provide for the capabilities disclosed herein. Further, the memory may include a volatile or non-volatile, magnetic, semiconductor, solid-state, tape, optical, removable, non-removable, or other type of storage device or tangible (i.e., non-transitory) computer-readable medium that stores one or more program(s), such as app(s). In an example, the computing device comprises one or more modules, namely a first module and a second module for executing the software program. Specifically, the first module is configured to execute the application program and the second module is configured to execute the internal debugger application.

Program(s) may include operating systems that perform known operating system functions when executed by one or more processing devices. By way of example, the operating systems may include Microsoft Windows™, Unix™, Linux™, Android™, Microsoft XP™, AIX™, IBM's i5os and Apple™ operating systems, Personal Digital Assistant (PDA) type operating systems, such as Microsoft CE™, or other types of operating systems. Accordingly, disclosed embodiments may operate and function with computing devices running any type of operating system. The computing device may also include communication software that, when executed by a processor, provides communications with network and/or local network, such as Web browser software, tablet, or smart hand held device networking software, etc.

Throughout the present disclosure, the term "users" refers to a person or a human being associated with a computing device and is enabled to run the application program on the computing device. Notably, the term "authorized users" and "unauthorized users" differ in a sense that the authorized users are programmers or developers that have access analyse the code i.e. the authorized users have access to view, modify or delete the code of the application program, while the unauthorized users are users (or players, in case of gaming applications) that do not have access to analyse the code of the application program.

The method comprises initializing the software program comprising an application program and an internal debugger application. The software program, upon initialization thereof, instructs the internal debugger application to load the application program in the internal debugger application, and wherein the internal debugger application is configured to utilize kernel resources of an operating system of the computing device. Throughout the present disclosure, the term "operating system" as used herein refers to a layer of system software that schedules threads (i.e. a single sequence stream within a process) and provides functions for making operating system resources available to threads, including memory access, access to input/output (IO) resources, and so on. Operating systems also control allocation and authorization for access to computer resources. Operating systems carry out low-level, basic tasks, such as receiving input from a keyboard, sending output to a display, maintaining a track of files and directories on a magnetic disk drive, and controlling peripheral devices such as disk drives and printers.

Throughout the present disclosure, the term "internal debugger application" as or generally known as "debuggers" refers to computer program or a software application used to test and debug other programs, which are referred to as debuggee programs. Generally, the internal debugger applications are used for testing the application programs and identify a cause of a known problem, or "bug", in the application programs. The testing of the application programs is generally referred to as "debugging". Notably, the internal debugger application is configured to execute one program instruction at a time (referred to as "single stepping" the program), and to determine what the next instruction to be executed. Further, the internal debugger application is used for examining and/or modifying computer register and memory locations. The internal debugger applications provide the program with information about the execution state of the running application program as well as control of it. The state of the application program includes program and data memory; hardware registers; program stacks; and operating system objects such as queues, synchronization objects, and program accounting information. The internal debugger application is configured to control the execution of the application programs with operations such as to stop (or alternatively to start, suspend, terminate, step over instructions, step into branches, step over statements, step through subroutine calls, stop at breakpoints (discussed later in detail), and stop at data watchpoints).

Specifically, the internal debugger application when attached to the application program, and the software program is running, an external debugger is blocked from attaching to the software program, thereby preventing analysis of code of the application program. Hereinafter, the term "external debugger application" is used to refer to a debugger application that is not integral to the software program, and is attempted to be attached to the application program with an intention to analyse code of the software program. Furthermore, the "external debugger application" is an unauthorized debugger application that is blocked out by implementing the present methods and systems. Indeed, as an example, running an internal debugger application, blocks running an external debugger application in the same computing device. In an example embodiment an operating system (kernel and the like) of the computing device is configured to allow only one debugger application to attach to single process simultaneously.

Further, as aforementioned, the internal debugger application utilizes the kernel resources of the operating system. Throughout the present disclosure, the "kernel resources" as used herein refers to a central module of the operating system associated with the computing device. Notably, kernel is a part of the operating system that loads first, and it remains in the memory. The kernel is responsible for memory management, process and task management, and disk management. The kernel connects the device hardware to the application program. Notably, the kernel is a software or part of the operating system and is responsible for providing secure access to hardware of the computing device on behalf of threads of execution in the application program. Further, the kernel also provides access to other components of the computing device including access to memory, processing capacity, input/output resources, and so forth. Kernels typically also provide hardware abstraction as a set of instructions universal to all devices of a certain type, thereby aiming to hide the underlying complexity from the application programs and from other components of the operating system. Beneficially, the kernel resources provide kernel services that control and mediate access to the hardware of the computing device, implement and support fundamental abstractions such as processes, threads, files, devices, and so forth, allocate and schedule operating system resources such as memory, processors, disks, file descriptors, process descriptors, thread descriptors, and the like, and provide security and protection of the operating system resources. It will be appreciated that the functions and operation of the operating system and the kernel resources as describes hereinabove should not unduly limit the scope of the claims appended herein, the operating system and the kernel resources can perform varied functions and operations as may be known in the art.

Further, the method comprises instructing the internal debugger application to load the application program in the internal debugger application. Herein, the software program may further comprise one or more batch files that upon initialization of the software program, instruct the application program to be loaded in the internal debugger application. Optionally, the method comprises configuring the application program to load in the internal debugger application. Herein, by loading the application program in the internal debugger application implies that the application program is configured to run in the internal debugger application. It will be appreciated that the application program is configured to run in the internal debugger application during run time, thereby preventing the external debugger application from debugging a particular application program.

Optionally, the application program is configured to initialize the internal debugger application upon start of the software program by a user of the computing device. The user may start the software program in a number of ways, for examples, by clicking on an executable file of the application program, that loads the application program in the internal debugger application. Optionally, the internal debugger application initializes the execution of the code of the application program. It will be appreciated that the application program is configured to perform execution only after the initialization of the internal debugger application. Such a method ensures that an external debugger application is not attached to the application program, thereby eliminating chances of unauthorized access to analyse or modify the code of the application program. It may be appreciated that, a code of the application program is integrated within the code of the application program to constitute the software program, such that an initialization of the software program will trigger an initialization of the internal debugger application, in a way that the code of the application program is configured to run in the internal debugger application.

Further, the method comprises executing the internal debugger application to set one or more break-points in the code of the application program to define an execution path for the code of the application program. Notably, the internal debugger application is configured to introduce one or more break-points in the code of the application program after one or more instruction sets of the code of the application program.

Herein, the term "break-points" is used to refer to an intentional stopping or pausing during the execution of the application program. Notably, the break-points are often inserted to determine whether an execution of the application program is functioning as expected. Break-points are used to interrupt a running application program immediately after a break-point is encountered. Notably, the break-points are inserted at different instructions in the code of the application program and new execution paths are correspondingly defined as per the inserted break-points. As aforementioned, the application program is configured to load in the internal debugger application. In an example, the execution of the internal debugger application is a parent process and execution of the application program is a child process, and the execution path can be defined to be defined accordingly.

Optionally, the one or more break-points are set to include instructions to move from one code block after execution thereof to another code block. Herein, the instructions may include memory addresses of the memory associated with the computing device. The memory address is fetched from the code of the internal debugging application, and move to execution of another code block accordingly. Optionally, the one or more break-points are set at end of one or more predetermined code blocks in the code of the application program. Optionally, the one or more break-points are set based on frequency of execution of one or more code blocks in the code of the application program. Optionally, the one or more break-points are set randomly at end of one or more code blocks in the code of the application program.

Further, the method comprises executing the application program as per the defined execution path for the code thereof. Herein, the term "execution path" refers to a path to be followed by the executable instruction set to access specified unique location executable files in the memory of the computing device. Notably, the execution path is defined prior to execution and after acquiring the kernel resources of the operating system of the computing device. It will be appreciated that the execution path is re-defined when break-points are inserted for instructions following a particular break-point. Further, the method comprises stopping execution of the code of the application program upon reaching any of the one or more break-points therein. Herein, when a break-point is encountered, the execution of the code of the application program in a first execution path is suspended, and execution of the code of the application program is initiated in a second execution path. Further, the method comprises handing control to the internal debugger application to provide an address for next instruction to be executed in the defined execution path for the code of the application program. Herein, after stopping of execution of the application program in the first execution path, the control is transferred to the internal debugger application via a second execution path. The code of the internal debugger application provides the address for next instruction to be executed according to a third execution path for the code of the application program.

In a case, when the one or more break-points are set at end of one or more predetermined code blocks in the code of the application program, the break-points are inserted after the end of last executable instruction of a first code block, such that a memory address of first executable instruction of a second code block to be executed is stored in a code of the internal debugger application. Herein, when a corresponding break-point is encountered, execution of the application program is stopped after the execution of the last executable instruction of the first code block, and a control is transferred to the internal debugger application. Further, the memory address of the first executable instruction of the another code block to be executed is fetched from the code of the internal debugger application. It will be appreciated that such a method ensures that the unauthorized users do not have access to the entire code of the application. In a scenario, when a user is able to get access to a particular part of code of the application program, the execution of the application program will be stopped when a break-point is encountered, and the address for the next instruction is not available to the unauthorized users, thereby preventing software piracy of the software program.

In a case, when the one or more break-points are set based on a frequency of execution of one or more code blocks in the code of the application program, the break-points are periodically inserted after or prior to code blocks that are most frequently used in the application program, such in case of gaming application programs. The break-points are inserted in a similar manner as mentioned before, by accessing the memory of the computing device. Herein, such a case when the break-points are prior to frequently used code blocks, ensures to secure the code blocks that are have a high risk of being accessed by unauthorized users.

In a case, when the one or more break-points are set randomly at end of one or more code blocks in the code of the application program, the break-points are inserted randomly after or before any of the code blocks. Herein, the break-points may be inserted dynamically at one or more positions, such that the positions of break-points are randomly changed each time the software program is initialized. It will be appreciated that the method of inserting break-points is same as discussed above, however the break-points are set dynamically.

The present disclosure further provides a system for a system for blocking an external debugger application from analysing a code of an application program installed on a computing device. The system comprises a debugging server communicatively coupled to the computing device. Throughout the present disclosure, the term "server" as used in "debugging server" refers to a structure and/or module that include programmable and/or non-programmable components configured to store, process and/or share information related to remote debugging. Optionally, the server includes any arrangement of physical or virtual computational entities capable of enhancing information to perform various computational tasks, such as remote debugging. Furthermore, it should be appreciated that the server may be both single hardware server and/or plurality of hardware servers operating in a parallel or distributed architecture. In an example, the server may include components such as memory, a processor, a network adapter and the like, to store, process and/or share information with other computing components, such as the computing device.

Notably, the computing device is communicatively coupled to the debugging server via a communication network. In an exemplary network environment, a number of computing devices are connected to the debugging server, and the debugging server is configured to provide remote debugging services to each of the computing devices connected over the communication network. As aforementioned, the application program is installed on the computing device, and is configured to access the debugging server when the application program is initialized on the computing devices. It will be appreciated that the application program is configured to run on the computing device only when the computing device is in connection with debugging server, thereby blocking the external debugger from analysing the code of the application program.

Herein, the communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Additionally, or alternatively, the computing devices may use their own Bluetooth® network, and connect to a Bluetooth® server, to synchronize with other electronic devices. The network environment may be implemented in various ways, depending on various possible scenarios. In one example scenario, the network environment may be implemented by way of a spatially collocated arrangement of the server and the database. In another example scenario, the network environment may be implemented by way of a spatially distributed arrangement of the server and the database coupled mutually in communication via the communication network. In yet another example scenario, the server and the database may be implemented via cloud computing services.

Further, the debugging server configured to attach an internal debugger application to the application program. Herein, the internal debugger application is configured to utilize kernel resources of an operating system of the computing device. Notably, the functions of the internal debugger application are same as described previous in the disclosure. However, it is to be understood that the internal debugger application as used in the system, is not integrated with the application program. Herein, the internal debugger application is configured to be accessed remotely via the communication network by the computing device. The internal debugger application when executed, causes the computing device to load the application program in the internal debugger application. Further, the internal debugger application sets one or more break-points in the code of the application program to define an execution path for the code of the application program. The internal debugger application executes the application program as per the defined execution path for the code thereof. The internal debugger application stops execution of the code of the application program upon reaching any of the one or more break-points therein. Further, the internal debugger application handovers control to the internal debugger application to provide an address for next instruction to be executed in the defined execution path for the code of the application program.

As aforementioned, the present disclosure also relates to a computer program product installed on a computing device, the computer program product comprising a non-transitory machine-readable data storage medium having stored thereon program instructions of a software program. The embodiments and details disclosed above apply mutatis mutandis to the said computer program product, that when executed block an external debugger application from analysing a code of the software program.

Optionally, the code of the application program includes multiple code blocks, wherein the one or more break-points include instructions to move from one code block after execution thereof to another code block.

Optionally, the program instructions of the computer program product, when accessed by the processing device, will cause the processing device to handover control to the internal debugger application to provide address for next code block to be executed in the defined execution path for the code of the application program.

Optionally, the program instructions of the computer program product, when accessed by the processing device, will cause the processing device to set the one or more break-points at end of one or more predetermined code blocks in the code of the application program.

Optionally, the program instructions of the computer program product, when accessed by the processing device, will cause the processing device to set the one or more break-points based on frequency of execution of one or more code blocks in the code of the application program.

Optionally, the program instructions of the computer program product, when accessed by the processing device, will cause the processing device to randomly set the one or more break-points at end of one or more code blocks in the code of the application program.

Optionally, the program instructions of the computer program product, when accessed by the processing device, will cause the processing device to configure the application program to initialize the internal debugger application upon start thereof by a user of the computing device.

Optionally, the program instructions of the computer program product, when accessed by the processing device, will cause the internal debugger application to initialize the execution of the code of the application program.

Optionally, the application program is a gaming application program.

As aforementioned, the present disclosure also provides a computing device for blocking an external debugger application from analysing a code of a software program installed on a computing device. The embodiments and details disclosed above apply mutatis mutandis to the said computing device for blocking the external debugger application from analysing code of the software program.

Optionally, the code of the application program includes multiple code blocks, wherein the one or more break-points include instructions to move from one code block after execution thereof to another code block.

Optionally, the computing device is further configured to handover control to the internal debugger application to provide address for next code block to be executed in the defined execution path for the code of the application program.

Optionally, the computing device is further configured to set the one or more break-points at end of one or more predetermined code blocks in the code of the application program.

Optionally, the computing device is further configured to set the one or more break-points based on frequency of execution of one or more code blocks in the code of the application program.

Optionally, the computing device is further configured to randomly set the one or more break-points at end of one or more code blocks in the code of the application program.

Optionally, the computing device is configured to initialize the internal debugger application upon start of the application program by a user of the computing device.

Optionally, the computing device is configured to initialize the execution of the code of the application program upon initialization of the internal debugger application.

DETAILED DESCRIPTION OF THE DRAWINGS

Referring to FIG. 1, illustrated is a flowchart 100 depicting steps of a method for blocking an external debugger application from analysing a code of a software program installed on a computing device, in accordance with an embodiment of the present disclosure. At step 102, the software program comprising an application program and an internal debugger application is initialized, the internal debugger application is configured to utilize kernel resources of an operating system of the computing device. At step 104, the internal debugger application is executed to set one or more break-points in the code of the application program to define an execution path for the code of the application program. At step 106, the application program is executed as per the defined execution path for the code thereof. At step 108, the execution of the code of the application program is stopped upon reaching any of the one or more break-points therein. At step 110, control is handover to the internal debugger application to provide an address for next instruction to be executed in the defined execution path for the code of the application program.

The steps 102 to 110 are only illustrative and other alternatives can also be provided where one or more steps are added, one or more steps are removed, or one or more steps are provided in a different sequence without departing from the scope of the claims herein.

Figure 2:
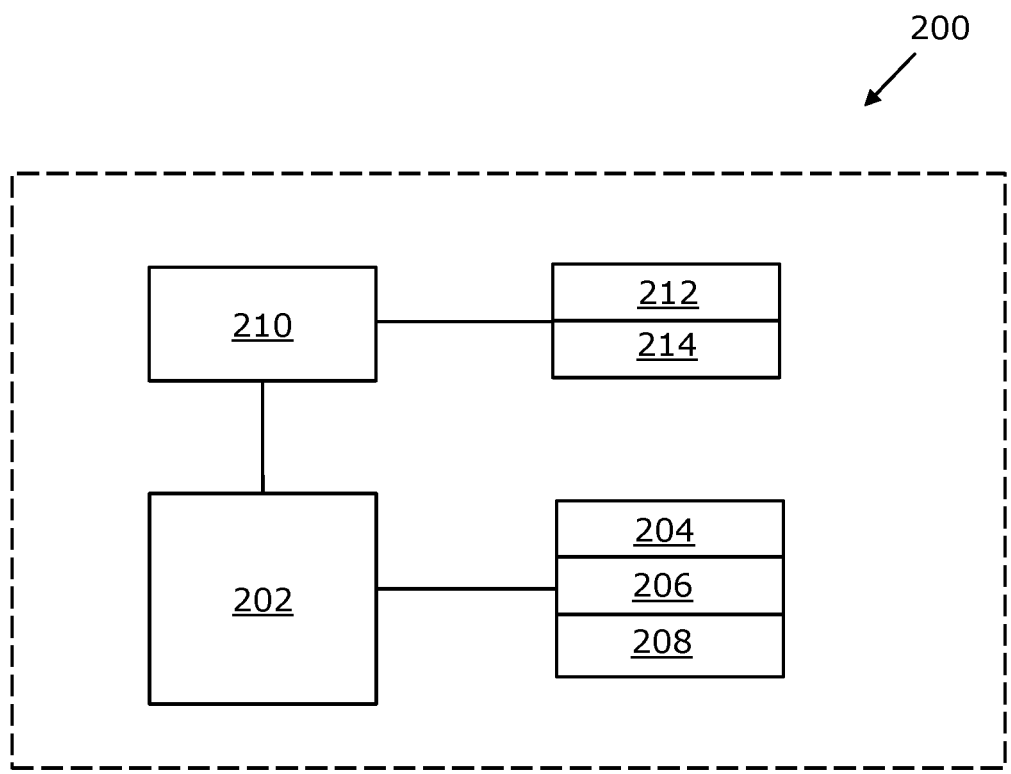
FIG. 2 is a is a block diagram of a computing device, in accordance with an embodiment of the present disclosure.

Referring to FIG. 2, illustrated is a block diagram of a computing device 200, in accordance with an embodiment of the present disclosure. As shown, the computing device 200 comprises a processing device 202, operating system (OS) 204, basic input output system (BIOS) 206, and kernel resources 208. The processing device 202 further comprises a memory 210 including Random Access memory (RAM) 212 and a flash memory 214. Herein, the processing device 202 is configured to access the kernel resources 208 of the operating system 204, upon initialization of the software program. Further, the processing device 202 allocates memory locations to code of the software program in the RAM 212. Further, the flash memory 214 is configured to store boot code from the BIOS 206 and the OS 204, to enable operations of the computing device 202.

Figure 3:
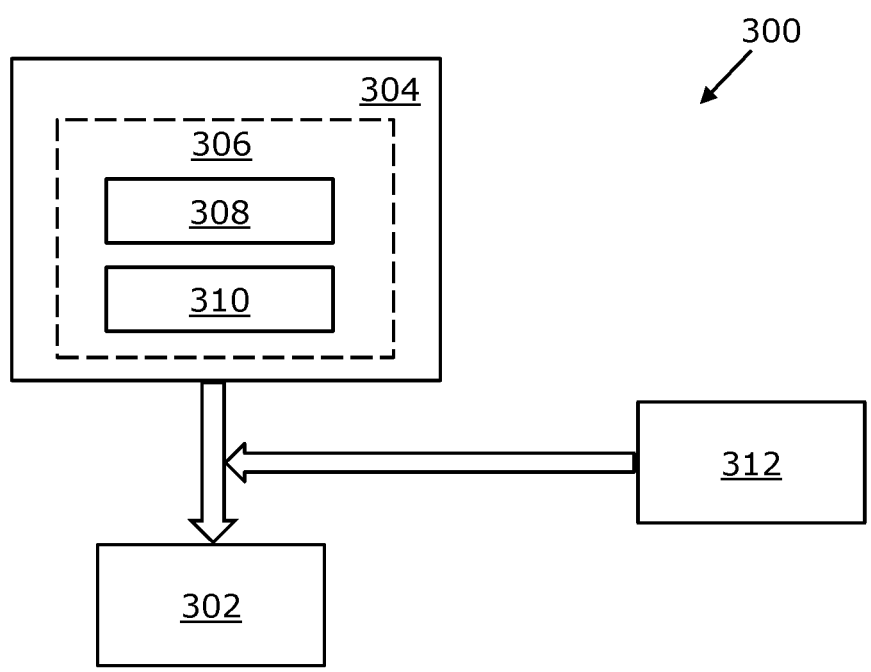
FIG. 3 is a block diagram depicting operation of a computing device (such as the computing device of FIG. 1), in accordance with an embodiment of the present disclosure.

Referring to FIG. 3, illustrated is a block diagram depicting operation of a computing device 300 (such as the computing device 200 of FIG. 1), in accordance with an embodiment of the present disclosure. As shown, the computing device 300 comprises a processing device 302 in communication with a memory 304. Herein, code of the software program 306 is stored in the memory 304. The software program 306 comprises application program 308 and an internal debugger application 310. The processing device 302 is configured to access the code of the software program 306 from the memory 304. Further, the processing device 302 is configured to utilize kernel resources 312 upon initialization of the software program 306.

Figure 4:
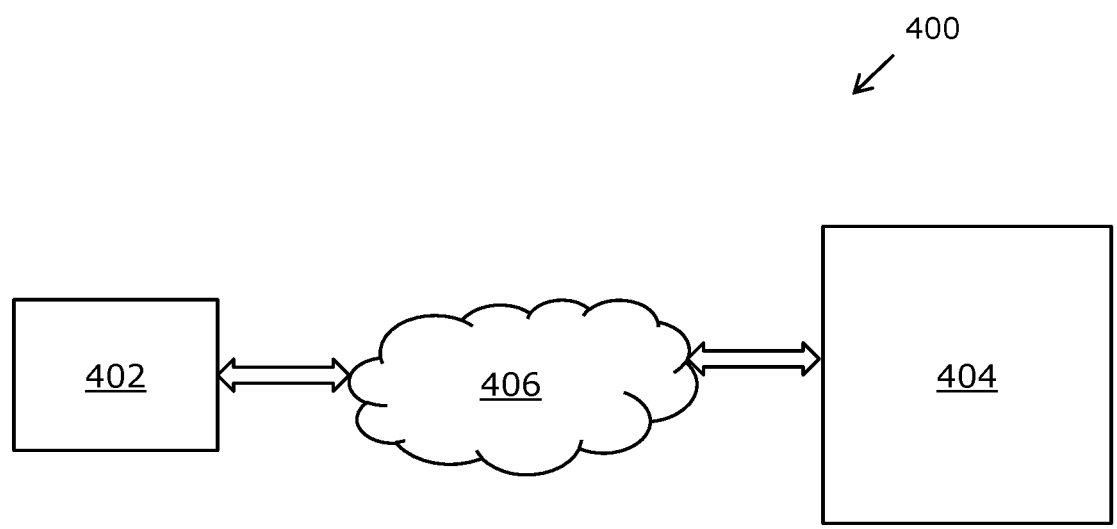
FIG. 4 is block diagram of a system for blocking an external debugger application from analysing a code of an application program installed on a computing device, in accordance with an embodiment of the present disclosure.

Referring to FIG. 4, illustrated is block diagram of a system 400 for blocking an external debugger application from analysing a code of an application program installed on a computing device 402, in accordance with an embodiment of the present disclosure. As shown, the system 400 comprises the computing device 402 communicatively coupled to a debugging server 404. Further, the computing device 402 communicatively and the debugging server 404 are connected via a communication network 406. Herein, the debugging server 404 is configured to provide debugging services to the computing device 402 by attaching an internal debugger application to the application program, thereby blocking the external debugger application.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for blocking an external debugger application from analysing a code of a software program installed on a computing device, the method comprising:
   initializing the software program comprising an application program and an internal debugger application, wherein the software program, upon initialization thereof, causes the internal debugger application to load the application program in the internal debugger application, and wherein the internal debugger application utilizes kernel resources of an operating system of the computing device;
   executing the internal debugger application to set one or more break-points in code of the application program to define an execution path for the code of the application program, wherein a break-point defines a new execution path and the one or more break-points include instructions to move one code block after execution thereof to another code block;
   executing the application program in the internal debugger application during run time as per a first execution path for the code of the application program;
   stopping execution of the code of the application program in the first execution path upon reaching a break-point of the one or more break-points; and
   handing control to the internal debugger application via a second execution path to provide an address for a next instruction to be executed in a third execution path following the break-point for the code of the application program.

2. The method according to claim 1, wherein the code of the application program includes multiple code blocks, wherein the one or more break-points include instructions to move from one code block of the multiple code blocks after execution thereof to another code block of the multiple code blocks.

3. The method according to claim 1, further comprises handing control to the internal debugger application to provide an address for a next code block to be executed in the defined execution path for the code of the application program.

4. The method according to claim 1, wherein the one or more break-points are set at an end of one or more predetermined code blocks in the code of the application program.

5. The method according to claim 1, wherein the one or more break-points are set based on a frequency of execution of one or more code blocks in code of the application program.

6. The method according to claim 1, wherein the one or more break-points are set randomly at an end of one or more code blocks in the code of the application program.

7. The method according to claim 1, wherein the application program initializes the internal debugger application upon start thereof by a user of the computing device.

8. The method according to claim 1, wherein the internal debugger application initializes the execution of the code of the application program.

9. The method according to claim 1, wherein the application program is a gaming application program.

10. A computer program product installed on a computing device, the computer program product comprising a non-transitory machine-readable data storage medium having stored thereon program instructions of a software program that, when accessed by a processing device associated with the computing device, will cause the processing device to:
   initialize the software program comprising an application program and an internal debugger application, wherein the software program, upon initialization thereof, instructs the internal debugger application to load the application program in the internal debugger application, and wherein the internal debugger application utilizes kernel resources of an operating system of the computing device;
   execute the internal debugger application to set one or more break-points in the code of the application program to define an execution path for the code of the application program, wherein a break-point defines a new execution path and the one or more break-points include instructions to move one code block after execution thereof to another code block;

execute the application program in the internal debugger application during run time as per a first execution path for the code of the application program;

stop execution of the code of the application program in the first execution path upon reaching a break-point of the one or more break-points therein; and handover control to the internal debugger application via a second execution path to provide an address for next instruction to be executed in a third execution path following the break-point for the code of the application program.

11. The computer program product according to claim 10, wherein the code of the application program includes multiple code blocks, wherein the one or more break-points include instructions to move from one code block after execution thereof to another code block.

12. The computer program product according to claim 10, wherein the program instructions, when accessed by the processing device, will cause the processing device to handover control to the internal debugger application to provide address for next code block to be executed in the defined execution path for the code of the application program.

13. The computer program product according to claim 10, wherein the program instructions, when accessed by the processing device, will cause the processing device to set the one or more break-points at end of one or more predetermined code blocks in the code of the application program.

14. The computer program according to claim 10, wherein the program instructions, when accessed by the processing device, will cause the processing device to set the one or more break-points based on frequency of execution of one or more code blocks in the code of the application program.

15. The computer program product according to claim 10, wherein the program instructions, when accessed by the processing device, will cause the processing device to randomly set the one or more break-points at end of one or more code blocks in the code of the application program.

16. The computer program product according to claim 10, wherein the program instructions, when accessed by the processing device, will cause the processing device to configure the application program to initialize the internal debugger application upon start thereof by a user of the computing device.

17. The computer program product according to claim 10, wherein the program instructions, when accessed by the processing device, will cause the internal debugger application to initialize the execution of the code of the application program.

18. The computer program product according to claim 10, wherein the application program is a gaming application program.

19. A computer program product embodied as a non-transitory machine-readable data storage medium for a computing device, the computer program product comprising a software program, wherein the software program comprises:
an application program; and
an internal debugger application utilizes kernel resources of an operating system of the computing device to block an external debugger application from analysing a code of the software program, the internal debugger application, when executed, causes the computing device to:

load the application program in the internal debugger application;

set one or more break-points in the code of the application program to define an execution path for the code of the application program, wherein a break-point defines a new execution path and the one or more break-points include instructions to move one code block after execution thereof to another code block;

execute the application program in the internal debugger application during run time as per a first execution path for the code of the application program;

stop execution of the code of the application program in the first execution path upon reaching a break-point of the one or more break-points therein; and hand over control to the internal debugger application via a second execution path to provide an address for next instruction to be executed in a third execution path following the break-point for the code of the application program.

20. A computing device for blocking an external debugger application from analysing a code of a software program installed on the computing device, the computing device configured to:

initialize using one or more processors stored in the computing device, the software program comprising an application program and an internal debugger application, wherein the software program, upon initialization thereof, instructs the internal debugger application to load the application program in the internal debugger application, and wherein the internal debugger application utilizes kernel resources of an operating system of the computing device;

execute the internal debugger application to set one or more break-points in the code of the application program to define an execution path for the code of the application program, wherein a break-point defines a new execution path and the one or more break-points include instructions to move one code block after execution thereof to another code block;

execute the application program in the internal debugger application during run time as per a first execution path for the code of the application program;

stop execution of the code of the application program in the first execution path upon reaching a break-point of the one or more break-points; and hand over control to the internal debugger application via a second execution path to provide an address for next instruction to be executed in a third execution path following the break-point for the code of the application program.

21. The computing device according to claim 20, wherein the code of the application program includes multiple code blocks, wherein the one or more break-points include instructions to move from one code block after execution thereof to another code block.

22. The computing device according to claim 20, further configured to handover control to the internal debugger application to provide address for next code block to be executed in the defined execution path for the code of the application program.

23. The computing device according to claim 20, further configured to set the one or more break-points at end of one or more predetermined code blocks in the code of the application program.

24. The computing device according to claim 20, further configured to set the one or more break-points based on frequency of execution of one or more code blocks in the code of the application program.

25. The computing device according to claim 20, further configured to randomly set the one or more break-points at end of one or more code blocks in the code of the application program.

26. The computing device according to claim 20, configured to initialize the internal debugger application upon start of the application program by a user of the computing device.

27. The computing device according to claim 20, configured to initialize the execution of the code of the application program upon initialization of the internal debugger application.

28. A system for blocking an external debugger application from analysing a code of an application program installed on a computing device, the system comprising:
- a debugging server communicatively coupled to the computing device, the debugging server configured to attach an internal debugger application to the application program, wherein the internal debugger application utilizes kernel resources of an operating system of the computing device, the internal debugger application when executed, causes the computing device to:
- load the application program in the internal debugger application;
- set one or more break-points in the code of the application program to define an execution path for the code of the application program, wherein a break-point defines a new execution path and the one or more break-points include instructions to move one code block after execution thereof to another code block;
- execute the application program in the internal debugger application during run time as per a first execution path for the code of the application program;
- stop execution of the code of the application program upon reaching any of the one or more break-points therein; and
- handover control to the internal debugger application to provide an address for next instruction to be executed in the defined execution path following the break-point for the code of the application program.

\* \* \* \* \*